United States Patent

[11] 3,607,306

| [72] | Inventor | Thomas F. McMichael<br>Edinburgh, Scotland |
|---|---|---|
| [21] | Appl. No. | 706,622 |
| [22] | Filed | Feb. 19, 1968 |
| [45] | Patented | Sept. 21, 1971 |
| [73] | Assignee | Cerebos Foods Limited<br>London, England |
| [32] | Priority | May 17, 1967 |
| [33] | | Great Britain |
| [31] | | 22845/67 |

[54] INSTANTIZED PRODUCTS
8 Claims, No Drawings

| [52] | U.S. Cl. | 99/124 |
|---|---|---|
| [51] | Int. Cl. | A23l 1/34 |
| [50] | Field of Search | 99/124, 130 |

[56] References Cited

UNITED STATES PATENTS

| 1,201,133 | 10/1916 | Askenasy | 99/130 |
|---|---|---|---|
| 1,735,356 | 11/1929 | Neff | 99/130 X |
| 1,929,732 | 10/1933 | Zeigler | 99/130 |
| 2,270,582 | 1/1942 | Esselen | 99/124 |
| 2,373,805 | 4/1945 | Barker | 99/124 |
| 2,379,065 | 6/1945 | Christopher | 99/130 X |
| 2,714,069 | 7/1955 | Stuart | 99/130 X |
| 2,819,970 | 1/1958 | Steigmann | 99/130 |
| 3,100,909 | 8/1963 | Schapiro | 99/124 X |
| 3,264,114 | 8/1966 | Glicksmann | 99/130 |

FOREIGN PATENTS

| 245,143 | 11/1959 | Australia | 99/130 |
|---|---|---|---|
| 419,838 | 11/1934 | Great Britain | 99/130 |
| 1,345,457 | 10/1963 | France | 99/124 |

*Primary Examiner*—Frank W. Lutter
*Assistant Examiner*—Robert Halper
*Attorney*—Bacon & Thomas

ABSTRACT: This invention relates to instantized products having thickening and/or flavoring and/or like properties which are for example useful in the production of foods and culinary preparations of the instantized type. The instantized products are prepared by incorporation of gelatin or other hydrophilic colloid to provide networks or paths whereby hot or cold aqueous liquid can readily penetrate throughout the product.

INSTANTIZED PRODUCTS

BACKGROUND

Starch-containing thickening agents and foods and culinary preparations based thereon are widely used for the preparation of starch-thickened foods. The expression "thickened food" refers to any food preparation in which starch or other thickening agent is used to impart a degree of thickening whether such foods be of fluid, pasty, semisolid or solid consistency. Examples of such foods include gravies, soups, sauces (both savoury and dessert), creams, etc.

Starch and starch-containing materials have been widely used as thickening agents in cooking for many years. They are for example commonly mixed with flavoring and coloring agents, as for example in custard powder and in gravy mixes for use with water or with meat stock to produce gravy.

In the case of starch-based products hitherto used it is generally essential to mix the product with cold liquid to form a substantially uniform dispersion prior to heating to effect gelatinization of the starch. Thus, if the starch is mixed directly with for example hot water, lumps are formed by the absorption of water and gelatinization of starch on the outside of agglomerates of starch particles and this prevents absorption of water and gelatinization so far as the particles within the agglomerates are concerned. Even where the correct technique is adopted and the starch is first dispersed in cold liquid prior to heating or the addition of hot liquid, the operation must be carried out with care in order to avoid the production of lumps in the thickened product. Instantized products having flavoring but not substantial thickening properties may also be useful in cooking for example in the production of soups, stocks, etc.

Starch-containing instantized products would also be useful outside the food industry. Thus for example starch is widely used in the laundry industry and an instantized product based on starch would be of use for this purpose.

It is one object of the present invention to provide starch-containing instantized products having thickening properties which are useful in the production of foods and culinary preparations and which can be readily dispersed in water (or water-containing foods) at temperatures sufficient to produce substantially immediate gelatinization of the starch e.g. at the boil.

It is a further object of the present invention to provide instantized products having flavoring but not substantial thickening properties which can be readily dispersed in hot or cold water (or water-containing foods).

It is a yet further object of the present invention to provide a starch-containing instantized product for use in the laundry industry.

SUMMARY OF THE INVENTION

The present invention is based essentially upon the discovery that an improved particulate instantized product is obtained when the particles of the said product include networks of gelatin or other hydrophilic colloid which serve to provide paths whereby hot or cold aqueous liquid can readily penetrate throughout the particles. The particulate instantized products may for example include thickening agents (conveniently ungelatinized starch), flavoring agents, coloring agents, nutritional agents, food components, fillers, diluents and the like, in each case with networks of gelatin or other hydrophilic colloid serving to provide means for penetration of the product by hot or cold aqueous liquid.

The expression "instantized" is used herein to refer to a solid preparation adapted to be mixed with cold or hot aqueous liquid and to be rapidly dispersed therein (e.g. in a matter of seconds) with or without heating and with comparatively little formation of undesirable lumps etc.

DETAILED DESCRIPTION

In the production of instantized products according to the present invention, the gelatin or other hydrophilic colloid is first mixed with the other desired ingredients of the instantized product, for example a thickening agent such as ungelatinized starch, flavoring agents, coloring agents, nutritional agents, food components, etc. Sufficient water is conveniently incorporated whereby a homogeneous paste is obtained. The paste is then partially dried and granulated to form the instantized product.

A preferred method for effecting partial drying and granulation involves extrusion of the paste though a die to form strands of extruded material. The extruded material will preferably have a diameter of less than 0.06 inches, and extrusion to form material having a diameter of from 0.04 to 0.05 inches is generally particularly preferred. The extruded mass is next partially dried (if starch is present at a temperature below the gelatinization point of the starch with the temperature of the mass being preferably maintained below 55° C.). The dried strands are then broken up, for example by passing through crushing rolls, and the product is sieved to eliminate particles which are too large in size. By this method, a particulate product can be obtained the particles of which are of relatively uniform size and shape.

The drying step is conveniently controlled to yield a product which has a moisture content below 16 percent and preferably from about 11 to 13 percent by weight. This latter moisture content is generally preferred, as products with moisture contents within this range do not readily either pick up water from, or lose water to, the atmosphere and consequently packaging of the product does not give rise to any special difficulty.

The amount of gelatin or other hydrophilic colloid incorporated into the instantized products according to the invention should be sufficient to provide means whereby the water or other aqueous liquid can readily penetrate throughout the particles of the product. With an instantized product containing starch, it is believed that where a mass of particles of the product prepared in accordance with the present invention is treated with for example hot water, even though gelatinization of starch first occurs on the outside of the mass nevertheless the hot water can pass along the network of hydrophilic colloid and can therefore effect gelatinization throughout the mass.

The proportion of gelatin or other hydrophilic colloid which is necessary for the desired effect depends upon the size of the particles to be formed by the method according to the invention; the smaller the particles the higher will in general be the required proportion of hydrophilic colloid. The proportion of gelatin or other hydrophilic colloid in the instantized products according to the invention will generally be less than 90 percent (and more usually less than 80 percent) by weight of the products, and proportions less than 70 percent or more conveniently less than 60 or 65 percent by weight will in general preferably be used. The proportion of gelatin or other hydrophilic colloid will usually be greater than about 1.5 percent by weight, and proportions greater than 2.5 percent or more especially 5 percent by weight are preferred. The range of 5 to 50 percent by weight, of gelatin in the instantized products according to the invention is especially preferred.

Where an instantized product having thickening properties is concerned, the preferred upper limit for the proportion of hydrophilic colloid will generally depend upon the desired viscosity of the foodstuff to be prepared using the product according to the invention. The higher the proportion of gelatin, the lower will be the viscosity of the foodstuff obtainable using the product. In for example starch-based products, proportions of gelatin or other hydrophilic colloid in the range of from 2.5 to 25 or 30 percent, advantageously from 10 to 20 percent, by weight of the starch in the instantized product are preferred.

Whilst the preferred hydrophilic colloid for use in the products according to the invention is gelatin, other hydrophilic colloids such as for example gum agar, tragacanth, guar gum, sodium alginate and certain cellulose esters may be used if so desired.

The instantized products according to this invention may for example contain ungelatinized starch (or other thickening agent) together with ingredients such as nutritional, flavoring and/or coloring agents, to provide an instantized food or culinary product adapted to be used for the preparation of thickened foods. For example by incorporation of meat flavor or meat extract with or without other materials e.g. fats and caramel color, an instant gravy may be prepared. Likewise with suitable choice of ingredients e.g. meat flavors meat extracts, vegetable products etc., instant soup or sauce preparations may be obtained. Dessert preparations may also be prepared with the aid of suitable materials e.g. sugars, custard powder, fruit flavours, essences e.g. vanilla essence and the like. Other possible preparations include rice puddings, potato products, batter mixes and dough mixes.

Instantized products according to the invention based on gelatin (or other hydrophilic colloid) and ungelatinized starch (or other thickening agent) may of course be used per se whether or not containing other materials in the thickening of stews, sauces, and the like.

Where the instantized products according to the invention possess flavoring but not substantial thickening properties they may again contain for example nutritional, flavoring and/or coloring agents to provide an instantized food or culinary product. If desired such products may also contain starch which has however been treated (conveniently by oxidation) to eliminate its thickening properties. The starch then serves essentially as a filler and diluent for the nutritional, flavoring and/or coloring agents or other ingredients of the instantized product, and may if desired by replaced by other suitable fillers or diluents. These instantized products may for example be adapted for the production of soups, stocks, liquid dessert preparations, drinks such as coffee and cocoa, etc.

According to one preferred feature of the present invention, the particles of the instantized product according to the invention are surface-coated with a humectant substance. This has the effect of increasing the hydrophilic properties of the surfaces of the particles, and is particularly desirable where the product consists of relatively small particles. The proportion of humectant required depends upon the surface area and therefore the particle size of the product. The proportion of the humectant substance used will however preferably be within the rage of from 1 to 50 percent by weight, advantageously about 5 percent by weight, of the product. A preferred humectant is glycerine; other humectants which may be used include for example sorbitol and propylene glycol. Where an excess of a humectant such as glycerine is used, products having a sticky appearance similar to that of Demerara sugar may be obtained. This may be an acceptable product for some purposes. The humectant is conveniently applied by spraying aqueous solutions on to the particles of the instantized product followed by a gentle mixing operation to disperse the humectant throughout the material, and after introduction of the humectant in this way it may be desirable to remove unwanted water whilst leaving a small amount of water on the surface of the particles in equilibrium with the atmospheric moisture.

The following Examples illustrate the invention:

Example 1
Instant gravy mix

A mixture is prepared having the following ingredients:

| Ingredients | Parts by weight |
| --- | --- |
| Starch | 250 |
| Flavoring and coloring | 75 |
| Salt | 50 |
| Gelatin | 25 |
| Water | 90 |
| Beef fat | 30 |

The ingredients are mixed in a heavy duty mixer to a homogeneous pasty mass. The past is extruded through a die with holes the diameter of which is 0.043 inches and the strands of extruded material are placed in a drier and allowed to dry to a moisture content of about 13 percent by weight at a temperature not exceeding 55° C. in order to avoid gelatinization of the starch. The dried strands are broken up by passing through widely set crushing rolls and are sieved to eliminate large pieces. The resultant product is a particulate instantized product having thickening properties for use in gravy making, the particles being of relatively uniform size and shape. The product can be instantly reconstituted with boiling water.

Example 2
Custard Powder

A mixture is prepared having the following ingredients:

| Ingredients | Part by weight |
| --- | --- |
| Edible Starch (potato) | 900 |
| Milk Powder | 850 |
| Sugar | 800 |
| Coloring | 10 |
| Flavor | 4 |
| Water | 390 |
| Gelatin | 90 |

The ingredients are mixed and converted to a particulate instantized product by a method analogous to that described in Example 1.

Example 3
Stock Powder:

A mixture is prepared having the following ingredients:

| Ingredients | Parts by weight |
| --- | --- |
| Thin-boiling starch | 250 |
| Flavoring and Color | 75 |
| Salt | 50 |
| Gelatin | 25 |
| Water | 90 |

The ingredients are mixed and converted to a particulate instantized product by a method analogous to that described in Example 1.

Example 4

| A. Mushroom soup Ingredients | Parts by weight |
| --- | --- |
| Potato Starch | 39 |
| Nonfat Milk Solids | 18 |
| Onion 'S' | 2 |
| Monosodium glutamate | 1.5 |
| Mushroom Powder | 2.0 |
| Mushroom Powder 'S' | 7.0 |
| Gelatin | 4.0 |
| Water | 26.0 |

The gelatin is fully hydrated in the water at approximately 40° C. The Mushroom 'S' and Onion 'S' flavours are then mixed in to the aqueous gelatin.

The remaining ingredients are mixed in a heavy duty mixer. The aqueous gelatin is then added and mixed to a homogeneous mass with the other ingredients.

The homogeneous mass is extruded through a die with holes the diameter of which is 0.043 inches and the strands of extruded material are placed in a drier and allowed to dry to a moisture content of about 13 percent by weight at a temperature not exceeding 55° C. in order to gelatinize the starch. The dried strands are broken up by passing through widely set crushing rolls and are sieved to eliminate large pieces.

The product is dry mixed with freeze-dried mushroom in the following proportions:

| Ingredients | Parts by weight |
| --- | --- |
| Above mix (dried) | 454 |
| Freeze-dried mushroom | 7 |

Example 5

| Ingredients | Parts by weight |
| --- | --- |
| Potato Starch | 32 |
| Nonfat Milk Solids | 16 |
| Salt | 9 |
| Gelatin | 3 |
| Water | 14 |

The gelatin is fully hydrated in the water at approximately 40° C. The other ingredients are mixed in a heavy duty mixer and the aqueous gelatin is added to form a homogeneous mass.

The homogeneous mass is extruded through a die with holes the diameter of which is 0.043 inches and the strands of extruded material are placed in a drier and allowed to dry to a moisture content of about 13 percent by weight at a temperature not exceeding 55° C. in order to gelatinize the starch. The dried strands are broken up by passing through widely set crushing rolls and are sieved to eliminate large pieces.

After granulation, the mix obtained may be utilized as follows:

a. For addition to other dry ingredients e.g. as follows:

| Ingredients | Parts by weight |
| --- | --- |
| Above mix (dried) | 6.0 |
| Onion Powder | 0.5 |
| Garlic Powder | 0.3 |
| Tomato flavor | 4 |
| Curry Powder | 4 |
| Freeze-dried Chicken | 10 |
| Dried Apple Pieces | 4 |

A curry sauce mix (chicken) is then obtained.

b. Without further modification, as a base for instant thickening of savory sauces and soups.

I claim:

1. An instantized gravy or soup mix in particulate form, comprising a mixture of ungelatinized starch, gelatin, water and flavoring, coloring or meat stock or vegetable components, said mixture having a moisture content below 16 percent by weight and containing no more than 35 percent by weight of said gelatin, said gelatin forming networks through the mixture serving as paths whereby hot aqueous liquid can penetrate therethrough.

2. An instantized product as claimed in claim 1 in which the particles are coated with from 1 to 50 percent by weight of a humectant substance.

3. An instantized product as claimed in claim 2 in which said humectant substance is glycerine.

4. An instantized product as claimed in claim 1 having a bulk density of from 0.3 to 0.5 grams/cc.

5. A process for the production of an instantized gravy or soup mix which comprises
   1. mixing aqueous gelatin with ungelatinized starch and flavoring, coloring or meat stock or vegetable components to form a homogenous paste containing an amount of not more than 30 percent by weight of starch and from 2.5 percent to 25 percent by weight of gelatin based on the weight of said starch;
   2. partially drying said paste; and
   3. comminuting the partially dried product to form an particulate instantized gravy or soup mix said gelatin having networks that provide paths whereby hot aqueous liquid can penetrate throughout said product.

6. A process as claimed in claim 5 in which said gelatin is present in an amount of from 10 to 20 percent by weight of said starch.

7. A process as claimed in claim 5 in which said homogenous paste is extruded prior to partial drying in step (2).

8. A process as claimed in claim 7 in which said extruded material has a diameter of from 0.04 to 0.05 inches.